July 24, 1956 — F. A. SCHICK — 2,756,065
CONTROL MECHANISM FOR BULLDOZER TRACTORS
Filed Dec. 2, 1953 — 2 Sheets-Sheet 1

Inventor
Frederick A. Schick
by Charles L. Schush
Attorney

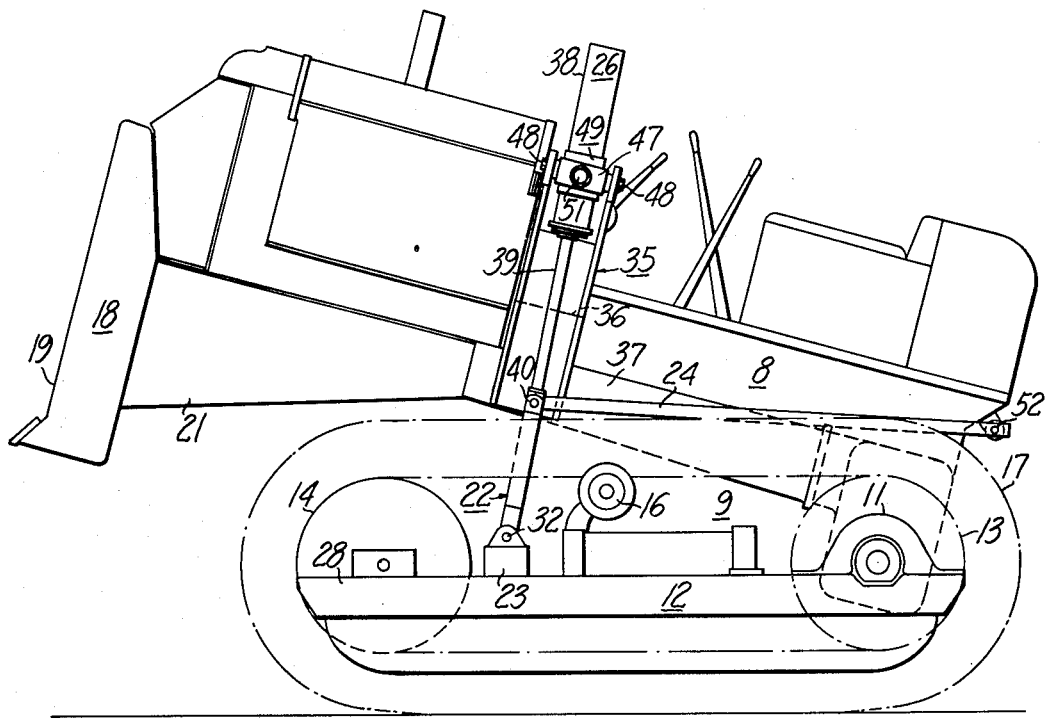

United States Patent Office 2,756,065
Patented July 24, 1956

2,756,065

CONTROL MECHANISM FOR BULLDOZER TRACTORS

Frederick A. Schick, Springfield, Ill., assignor to Allis-Chalmers Manufacturing Company, Milwaukee, Wis.

Application December 2, 1953, Serial No. 395,704

11 Claims. (Cl. 280—44)

The invention relates to earth working machines, and it is concerned more particularly with a crawler type bulldozer tractor wherein the blade is rigidly secured to the tractor main body and wherein the cutting height of the blade is adjusted by pivotal up and down movement of the tractor main body and blade as a unit relative to the track frames.

In order to convert a crawler tractor of conventional construction into a bulldozer tractor of the above outlined character, it has heretofore been suggested to remove the forward cross spring which is usually interposed between the tractor main body and track frames and to provide in its place a hydraulically operated mechanism for effecting the desired pivotal adjustment of the tractor main body and blade relative to the track frames. Experience has shown that such a hydraulically operated adjusting mechanism for the tractor main body presents a number of problems from an engineering as well as from a performance standpoint. For instance, the mechanism should be so constructed that it can be installed on an existing tractor without major change of any of the component parts of the tractor; and the mechanism should be compact so as not to objectionally interfere with the operator's range of vision or with his access to the driver's seat. A particular requirement, from a performance standpoint, is that the track frames should not be subjected to excessive loads which may cause them to twist or tilt inwardly toward the tractor main body, or to spread outwardly away from the tractor main body.

Generally, it is an object of the invention to provide an improved mechanism for adjusting the tractor main body relative to the track frames and which will take care of the mentioned requirements in a practical and entirely satisfactory manner.

More specifically, it is an object of the invention to provide an adjusting mechanism of the above outlined character incorporating a pair of hydraulic rams and a linkage system which will transmit the thrust of the rams to track frames in generally vertical directions and in such a manner as to avoid excessive bending or twisting loads upon the track frames.

It is a further object of the invention to provide an improved bulldozer tractor of the hereinabove outlined character which is economical to manufacture and gives long trouble free service.

These and other objects and advantages are attained by the present invention, various novel features of which will be apparent from the description herein and from the accompanying drawings disclosing an embodiment of the invention, and will be more particularly pointed out in the appended claims.

In the drawings:

Fig. 3 is another view similar to Fig. 1 but showing the tractor adjusted to a maximum blade lifted position;

Fig. 4 is a sectional end elevation of the tractor shown in Fig. 1, the section being taken on the line IV—IV in Fig. 1; and Fig. 5 is an enlarged detail view, in section, taken on the line V—V in Fig. 1.

Figure 1:
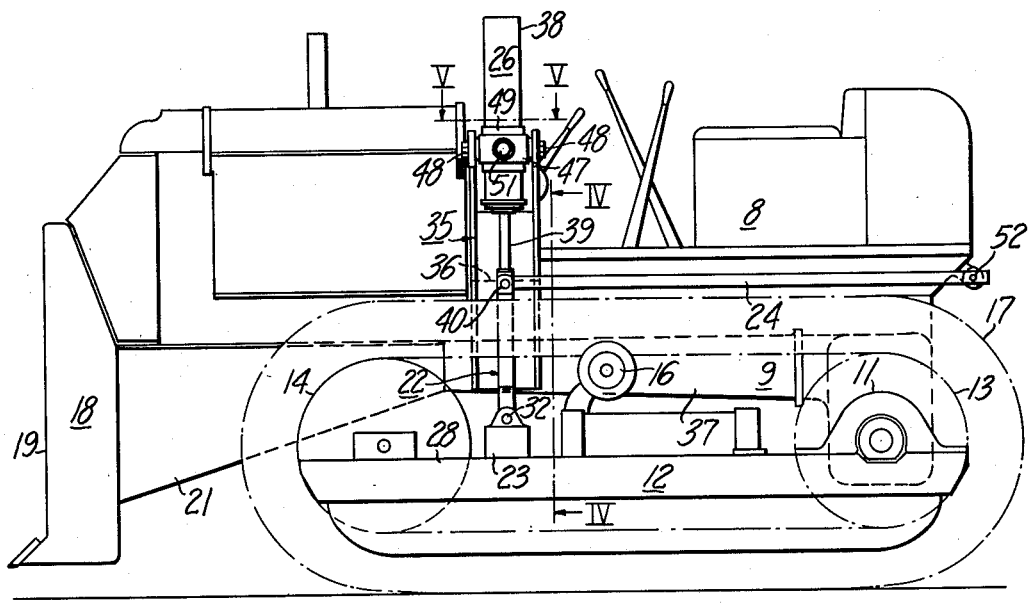
Fig. 1 is a side view of a bulldozer tractor incorporating this invention, the tractor as shown in this figure being adjusted to an intermediate blade lifted position.

Referring to Figs. 1 and 4, the tractor component of the machine comprises a main body 8, and a pair of self-laying track units 9 and 10 which are pivotally connected in conventional manner to a transverse rear axle structure 11 at the rear end of the main body 8. Track unit 9 includes a swing frame or track frame 12, a track belt drive sprocket 13, a track idler 14, a track supporting roller 16 and an endless track belt 17, all constructed and arranged in general conformity with established practice. Referring specifically to Fig. 4, the right side track unit 10 includes a swing frame or track frame 12', a track belt drive sprocket, not shown, a track idler, not shown, a track roller, not shown, and an endless track belt 17', all of conventional construction.

The implement component of the machine comprises a bulldozer assembly 18 which is rigidly secured to the forward end of the tractor main body 8. The bulldozer assembly includes a transversely disposed blade 19 and mounting braces 21 and 21', these braces being rigidly secured to opposite sides of the main body frame. Thus the excavating blade of the bulldozer tractor is in effect an extension of the main body 8.

The tractor main body 8 and the bulldozer assembly 18 attached thereto, are pivotally adjustable as a unit about the axis of the rear axle structure 11 by means of a hydraulically operated control mechanism which is operatively interposed between the main body 8 and the swing frames 12 and 12', and which is constructed as follows:

At the left side of the main body 8, as shown at the left of Fig. 4, an adjustable load transmitting connection between the main body 8 and the left track unit 9 is established by means of a vertically disposed link 22, a transversely disposed bracket 23, a longitudinally disposed antijackknife link 24 and a vertically disposed power transmitting means or jack in the form of a hydraulic ram 26. Bracket 23 is secured as by welding at its inner end to an inner channel 27 of the track frame and at its outer end to an outer channel 28 of the track frame. Vertically disposed link 22 is L-shaped and has a transversely extending portion 29 with a pair of hinge members 31 depending therefrom. The hinge members 31 are pivotally connected, respectively, on a transverse axis by pivot pins 32 to a pair of upwardly extending hinge members 33 formed at the transversely opposite ends of bracket 23. Link 22 has a vertical portion 34 extending upwardly from the track frame between the endless track belt 17 and the main body 8. The upper end of the vertical portion 34 of the L-shaped link 22 is vertically aligned with the inner channel 27 and is stabilized against lateral displacement by the two spaced pivot connections between the transversely disposed portion 29 of the L-shaped link 22 and the bracket 23.

The hydraulic ram 26 is universally mounted on a supporting bracket 35. Supporting bracket 35 is rigidly secured to a mounting plate 36 which is in turn rigidly secured to a longitudinally disposed frame member 37 on the left side of the tractor. The upper end of supporting bracket 35 supports the ram 26 so that the ram is vertically above the inner track frame 27. The hydraulic ram 26 has a cylinder 38, a piston, not shown, and a piston rod 39 secured to the piston and extending from the lower end of the cylinder. The lower end of the piston rod 39 and the forward end of the antijackknife link 24 are pivotally connected to the upper end of the vertical portion 34 of the L-shaped link 22 by a pivot pin 40. The antijackknife link 24 keeps the axis of pivot pin 40 coplanar with the axes of pivot pins 32 and the piston rod 39. Since the line of force transmitted by the ram 26 lies in a longitudinally disposed vertical plane, the track frames are not subjected to lateral forces which might tend to distortingly spread the track frames apart. Thus the running gear units 9 and 10 retain their proper parallel relationship.

At the right side of the tractor there is provided a reverse duplicate of the adjustable load transmitting mechanism provided at the left side of the tractor. The components of the load transmitting mechanism at the right side of the tractor are indicated by the same reference characters as are used for the left side load transmitting mechanism, except for addition of a prime symbol.

Thus at the right hand side of the tractor there is provided an L-shaped link 22' which has one of its legs pivotally secured to a transversely disposed bracket 23' which in turn is rigidly secured to the channels 27' and 28' of the track frame 10. A pair of pivot pins 32' pivotally connect hinge members 31' formed on leg portion 29' of L-shaped link 22' to hinge members 33' formed on bracket 23'. A transversely disposed pin 40' pivotally connects the upper end of a vertical leg portion 34' of link 22' to a forward end of an antijackknife link 24' and to the lower end of a piston rod 39' of a ram 26'. The upper end of a supporting bracket 35' is universally connected to a cylinder 38' of ram 26'. The lower end of bracket 35' is rigidly secured to a mounting plate 36' which in turn is rigidly secured to a frame member 37'.

The rams 26 and 26' are double acting and have their corresponding ends interconnected for fluid communication by conduits. The upper ends of cylinders 38 and 38' are interconnected by a conduit 41 and the lower ends of the cylinders 38 and 38' are interconnected by a conduit 42. Conduits 43 and 44 lead from conduits 41 and 42, respectively, to conventional fluid supply equipment, not shown, mounted on the tractor in a suitable manner. This fluid supply equipment being selectively operable to supply fluid under pressure to either one of the conduits 43 and 44 while allowing return of fluid to the fluid supply equipment from the other conduit. Intercommunication between corresponding ends of the cylinders 38 and 38' allows free flow of fluid between the corresponding ends of the rams and this provides equal fluid pressure in the corresponding ends of the rams during working operations. Also this intercommunication of fluid between corresponding ends of the cylinders allows relative vertical swinging between the two track units without a change in the sum total of the fluid in both the corresponding ends of the cylinders, for instance, the aggregate amount of fluid in the upper ends of both of the cylinders 38 and 38'.

Referring to Fig. 5, the upper end of the supporting bracket 35 presents a pair of spaced mounting arms 46 on which a gimbal ring 47 is pivotally mounted on a longitudinal axis by a pair of pivot pins 48. The cylinder 38 of the hydraulic ram 26 has a reinforcing ring 49 secured about the outer periphery of its cylinder 38 and ring 49 is pivotally connected to the gimbal ring 47 on a transverse axis by a pair of pivot pins 51. Thus hydraulic ram 26 is pivotally connected to the main body of the tractor by a gimbal joint allowing universal movement of the ram 26. A gimbal joint is similarly provided for universally mounting ram 26' to supporting bracket 35'.

Figure 2:
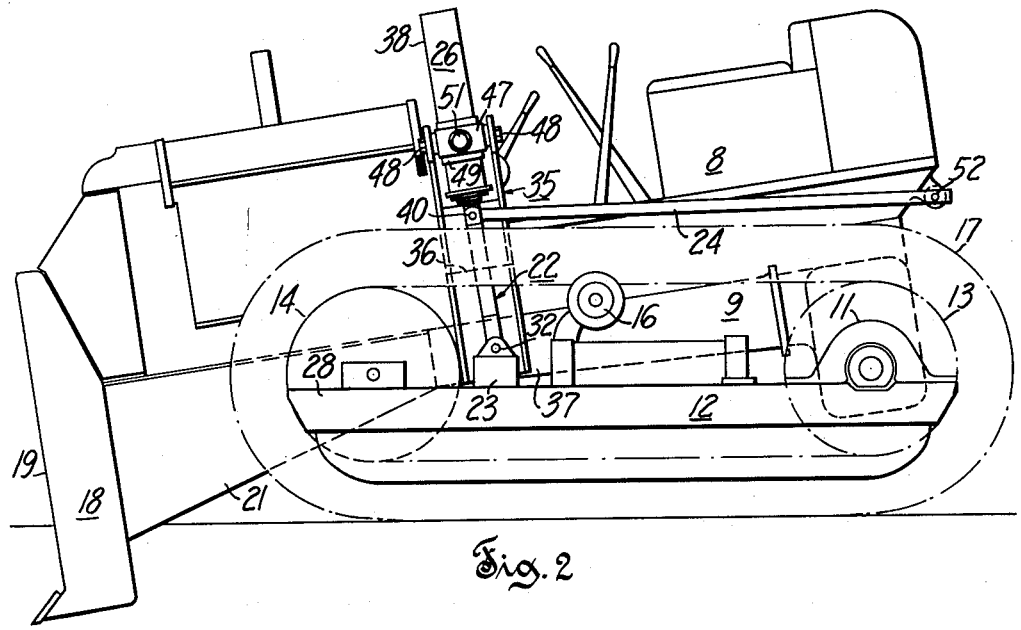
Fig. 2 is similar to Fig. 1 but showing the tractor adjusted to a blade lowered position.

Referring to Fig. 2, the main body 8 of the tractor is pivoted downwardly at its forward end relative to its running track unit 9 to provide the deepest digging position of the blade 19. This pivoting of the main body, on which the blade 19 is secured, is about the transverse axis of rear axle structure 11, and is effected by the jack means or rams 26 and 26', the rams being shown in their extreme contracted condition. In this condition of pivotal adjustment of the main body, the axes of the pivot pins 32, 40 and 51 lie in a common plane which extends transversely of the tractor and likewise the axis of pivot pins 32', 40' and 51' lie in a common plane which extends transversely of the tractor. Antijackknife links 24 and 24' are pivotally attached to the rearward end of the main body 8 by pivot pins 52, only one of which is shown. Pivot pins 52 have a common transverse axis. Since the pivot pins 32, 40 and 51 have axes lying in a common transverse plane in the position of the main body shown in Fig. 2, it follows that the antijackknife link 24, which determines the position of pivot pin 40 longitudinally of the tractor is, theoretically, under neither compression or tension. By way of the same reasoning, link 24' is, theoretically, free from compression or tension.

Referring again to Fig. 1, the axis of pivot pin 40 lies slightly forward of a plane passing through the transverse axes of pivot pins 32 and 51, by a distance of a fraction of an inch, this distance depending on the size of the crawler tractor on which the control mechanism is installed. In this raised position of the main body and blade, the antijackknife link 24 is in tension, but since the axes of pivots 32, 40 and 51 lie substantially in a common transverse plane, the amount of tension force is small relative to the force transmitted by the ram 26 to the L-shaped link 22. By similar analysis, it is evident that antijackknife link 24' is subjected to a slight tension.

Referring to Fig. 3, the main body 8 is shown in its extreme blade lifted position, the rams 26 and 26' being fully expanded. In this position, the axis of pivot pin 40 is slightly to the right of a plane passing through the axis of pivot pins 32 and 51, thereby subjecting antijackknife link 24 to a compressive force. Here again, the distance by which the axis of pivot pin 40 is moved out of the plane passing through the axes of pivot pins 32 and 51 is relatively small. Since pivot pin 40 is out of coplanar relationship with pivot pins 32 and 51 by only a small distance, the axes of these three pivot pins can be considered to be substantially coplanar. Because of the slight off line relationship between pivot pin 40 and pivot pins 32 and 51, a small amount of compressive force is transmitted to antijackknife link 24, this compressive force being relatively small compared to the force transmitted by ram 26 to link 22. By a similar analysis, it follows that link 24' is subjected to a slight compressive force.

The control mechanism incorporating the invention is shown and described to include a left side and a right side lift means for carrying and adjusting the elevation of the front end of the main body of a crawler tractor relative to its track frames which are pivotally connected to the main body on a first transverse axis by a rear axle 11. The left side lift means comprise vertically disposed member 22 pivotally connected at its lower or bottom end on a second transverse axis to the track frame 12 at one side of the main body by pins 32, an antijackknife link 24 pivotally connected at one of its ends on a third transverse axis to the main body 8 by pin 52 and pivotally connected at its other end to the upper end of link 22, and a jack 26 having one of its ends pivotally connected on a fourth transverse axis to the main body 8 by pins 51 and having its other end pivotally connected on a fifth transverse axis to the upper end of link 22 by pin 40. The links and pivot pins are arranged, constructed and located so that in all working conditions of the blade and main body the second, fourth and fifth transverse axes lie substantially in a common transverse plane. Antijackknife link 24 serves as a guide member and is associated with vertically disposed member 22 so as to maintain the fifth transverse axis substantially in a plane passing through the second and fourth transverse axes. Also the line of force transmitted by the jack 26 lies in a longitudinally disposed vertical plane passing through the inner channel 27 of the track frame 12. This description of the lift means for the left side of the tractor is equally applicable to the right side lift means.

The corresponding ends of the hydraulic rams 26 and 26' are interconnected by conduits allowing free flow of the fluid between the corresponding ends of the ram cylinders. This interconnection for free fluid flow insures equalization of the pressure and consequently equal forces are applied to the two track frames 12 and 12'. This intercommunication of fluid between the cylinders also allows the track frames to pivot relative to each other about the common transverse axis of rear axle 11 when the tractor traverses uneven ground.

It should be understood that it is not intended to limit the invention to the hereinabove described forms and details, and that the invention includes such other forms and modifications as are embraced by the scope of the appended claims.

It is claimed and desired to secure by Letters Patent:

1. In a tractor having a main body and a pair of swing frames pivotally mounted, respectively, at opposite sides of said main body for independent up and down swinging movement relative thereto on a common transverse axis, the combination of means operable to pivot said main body relative to said swing frames about said transverse axis and comprising, at each side of said main body; an L-shaped link having one of its legs pivotally connected to the respective swing frame on a horizontal transverse axis and having its other leg disposed to extend upwardly from said one leg; a vertically disposed expansible and contractable jack; pivot means connecting the upper end of said jack to said main body; pivot means connecting the lower end of said jack to the upper end of said other leg of said L-shaped link; an antijackknife link pivotally connected at one of its ends to said main body; and pivot means connecting the other end of said antijackknife link to the upper end of said other leg of said L-shaped link.

2. In a tractor having a main body and a pair of swing frames, each including an endless track belt, pivotally mounted, respectively, at opposite sides of said main body for independent up and down swinging movement relative thereto on a common transverse axis, the combination of means operable to pivot said main body relative to said swing frames about said transverse axis and comprising, at each side of said main body; an L-shaped member having one of its legs pivotally connected to the respective swing frame on a horizontal transverse axis and having its other leg disposed to extend upwardly from said one leg between the respective endless track belt and the adjacent side of said main body, a longitudinally disposed antijackknife link pivotally connected at its rearward end to the rearward end of said main body and pivotally connected at its forward end to the upper end of said other leg of said L-shaped member, and selectively expansible and contractable jack means operatively disposed between said main body and said upper end of said other leg of said L-shaped member.

3. In a crawler tractor having a main body and a pair of swing frames pivotally connected, respectively, to opposite sides of the rear portion of said main body on a transverse axis and in which each of said swing frames has an inner channel and an outer channel for mounting wheels for operative association with an endless track belt, the combination of lift means between said swing frames and said main body comprising, at each side of said main body; a vertically disposed member pivotally connected at its bottom on a transverse axis to said inner and outer channels of the associated swing frame and extending upwardly between the associated track belt and said main body, said vertically disposed member being formed so that its upper end is disposed vertically above said inner channel of said associated swing frame; a longitudinally disposed antijackknife link having a rearward end pivotally connected to said rear portion of said main body and having a forward end pivotally connected to said upper end of said vertically disposed member; and a vertically disposed hydraulic jack pivotally connected at its upper end to said main body and pivotally connected at its lower end to said upper end of said vertically disposed member.

4. In a crawler tractor having a main body and a pair of swing frames pivotally connected, respectively, to opposite sides of the rear portion of said main body on a transverse axis and in which each of said swing frames has an inner channel and an outer channel for mounting wheels for operative association with an endless track belt, the combination of lift means between said swing frames and said main body comprising, at each side of said main body; a vertically disposed member pivotally connected at its bottom on a horizontal transverse axis to said inner and outer channels of the associated swing frame and extending upwardly between the associated track belt and the adjacent side of said main body, said vertically disposed member being formed so that its upper end is disposed vertically above said inner channel of said associated swing frame; a longitudinally disposed antijackknife link having a rearward end pivotally connected to said rearward portion of said main body and having a forward end pivotally connected to said upper end of said vertically disposed member; and a vertically disposed hydraulic ram pivotally connected at its upper end to said main body and pivotally connected at its lower end to said upper end of said vertically disposed member, said rams having their corresponding ends interconnected by conduits so as to permit relative swinging movement of said swing frames about said transverse pivot axis.

5. In a crawler tractor having a main body and a pair of running gear units pivotally connected on a common axis to opposite sides, respectively, of the rear portion of said main body, each of said running gear units including an endless track belt and a track frame having an inner channel and an outer channel for mounting wheels for operative association with said endless track belt, the combination of means operable to pivot said main body relative to said running gear units about said common transverse axis and comprising, at each side of said main body; a vertically disposed member pivotally secured at its bottom on a transverse axis to said channels of the associated track frame and extending upwardly between said main body and the endless track belt associated with said associated track frame, said vertically disposed member being formed so that its upper end is disposed vertically above said inner channel of said associated track frame; a longitudinally disposed antijackknife link having a rearward end pivotally connected to said main body and having a forward end pivotally connected to said upper end of said vertically disposed member; and a vertically disposed hydraulic ram having a cylinder pivotally connected to said main body on a transverse axis and having a piston rod pivotally connected to said upper end of said vertically disposed member on a transverse axis, said transverse axes lying substantially in a common transversely disposed plane in any one of the pivotally adjustable positions of said main body relative to said running gear units.

6. In a crawler tractor having a main body and a pair of running gear units pivotally connected on a common axis to opposite sides, respectively, of the rear portion of said main body, each of said running gear units including an endless track belt and a track frame having an inner channel and an outer channel for mounting wheels for operative association with said endless track belt, the combination of means operable to pivot said main body relative to said running gear units about said common axis and comprising, at each side of said main body; an L- shaped member having one of its legs pivotally secured on a transverse axis to the inner and outer channels of the associated track frame and having its other leg extending upwardly between the endless track belt carried by said associated track frame and said main body, said other leg of said L-shaped member being formed so that its upper end is disposed vertically above said inner channel of said associated track frame; a longitudinally disposed antijackknife link having its rearward end pivotally connected to the rearward end of said main body and having its forward end pivotally connected to said upper end of said other leg of said L-shaped member; and a vertically disposed hydraulic ram having a cylinder pivotally connected to said main body on a transverse axis and having a piston rod pivotally connected at its lower end on a transverse axis to said upper end of said other leg of said L-shaped member; said transverse axes lying substantially in a common transversely disposed plane in any one of the pivotally adjustable positions of said main body relative to said running gear units, and said cylinder having an axis lying in a vertical plane disposed longitudinally of said associated track frame and passing through said inner channel of said associated track frame.

7. In a tractor having a main body and a pair of swing frames pivotally mounted, respectively, at opposite sides of said main body for independent up and down swinging movement relative thereto on a common axis, the combination of means operable to pivot said main body relative to said swing frames about said common axis and comprising, at each side of said main body: a vertically disposed load transmitting element pivotally connected at its lower end on a transverse axis to the respective swing frame, selectively expansible and contractable jack means mounted on said main body and having a reciprocable thrust transmitting element pivotally connected to the upper end of said load transmitting element, and an antijackknife structure operatively interposed between one of said elements and said main body in vertically movable and horizontal thrust transmitting relation to the latter so as to maintain the line of thrust of said thrust transmitting element substantially in a plane passing through said transverse axis throughout the range of swinging movement of said associated swing frame.

8. In a tractor having a main body and a pair of swing frames pivotally mounted, respectively, at opposite sides of said main body for independent up and down swinging movement relative thereto on a common axis, the combination of means operable to pivot said main body relative to said swing frames about said common axis and comprising, at each side of said main body; a vertically disposed load transmitting element pivotally connected at its lower end on a transverse axis to the respective swing frame, a hydraulic jack pivotally mounted on said main body and having a reciprocable thrust transmitting element pivotally connected to the upper end of said load transmitting element, and an antijackknife structure operatively interposed between one of said elements and said main body in vertically movable and horizontal thrust transmitting relation to the latter so as to maintain the line of thrust of said thrust transmitting element substantially in a plane passing through said transverse axis throughout the range of swinging movement of said associated swing frame.

9. In a tractor having a main body and a pair of swing frames pivotally mounted, respectively, at opposite sides of said main body for independent up and down swinging movement relative thereto on a common axis, the combination of means operable to pivot said main body relative to said swing frames about said common axis and comprising, at each side of said main body; a vertically disposed load transmitting element pivotally connected at its lower end on a transverse axis to the respective swing frame, selectively expansible and contractable jack means mounted on said main body and having a reciprocable thrust transmitting element pivotally connected to the upper end of said load transmitting element, and a link member pivotally connected at one of its ends to said main body and pivotally connected at its other end to one of said elements so as to maintain the line of thrust of said thrust transmitting element substantially in a plane passing through said transverse axis throughout the range of swinging movement of said associated swing frame.

10. In a tractor having a main body and a pair of swing frames pivotally mounted, respectively, at opposite sides of said main body for independent up and down swinging movement relative thereto on a common axis, the combination of means operable to pivot said main body relative to said swing frames about said common axis and comprising, at each side of said main body; a vertically disposed load transmitting element pivotally connected at its lower end on a transverse axis to the respective swing frame, a hydraulic jack pivotally mounted on said main body and having a reciprocable thrust transmitting element pivotally connected to the upper end of said load transmitting element, and a longitudinally extending link pivotally connected at its rearward end to said main body and pivotally connected at its forward end to one of said elements so as to maintain the line of thrust of said thrust transmitting element substantially in a plane passing through said transverse axis throughout the range of swinging movement of said associated swing frame.

11. In a tractor having a main body and a pair of swing frames pivotally mounted, respectively, at opposite sides of said main body for independent up and down swinging movement relative thereto on a common axis, the combination of means operable to pivot said main body relative to said swing frames about said common axis and comprising, at each side of said main body; a vertically disposed load transmitting element pivotally connected at its lower end on a transverse axis to the respective swing frame, a hydraulic jack pivotally mounted on said main body and having a reciprocable thrust transmitting element pivotally connected to the upper end of said load transmitting element, and a longitudinally extending link pivotally connected at its rearward end to the rear portion of said main body and pivotally connected at its forward end to the upper end of said load transmitting element so as to maintain the line of thrust of said thrust transmitting element substantially in a plane passing through said transverse axis throughout the range of swinging movement of said associated swing frame.

References Cited in the file of this patent
UNITED STATES PATENTS

| | | |
|---|---|---|
| 2,453,388 | Schramm | Nov. 9, 1948 |
| 2,495,057 | Dillingham | Jan. 17, 1950 |